(12) United States Patent
Nelson et al.

(10) Patent No.: US 6,648,307 B2
(45) Date of Patent: Nov. 18, 2003

(54) METHOD TO INCREASE THE QUANTITY OF DISSOLVED GAS IN A LIQUID AND TO MAINTAIN THE INCREASED QUANTITY OF DISSOLVED GAS IN THE LIQUID UNTIL UTILIZED

(75) Inventors: Steven L. Nelson, Minnetonka, MN (US); Kurt K. Christenson, Minnetonka, MN (US)

(73) Assignee: FSI International, Inc., Chaska, MN (US)

( * ) Notice: Subject to any disclaimer, the term of this patent is extended or adjusted under 35 U.S.C. 154(b) by 0 days.

(21) Appl. No.: 10/269,240

(22) Filed: Oct. 11, 2002

(65) Prior Publication Data

US 2003/0042631 A1 Mar. 6, 2003

Related U.S. Application Data

(60) Continuation of application No. 09/248,874, filed on Feb. 11, 1999, now Pat. No. 6,488,271, which is a division of application No. 08/960,277, filed on Oct. 29, 1997, now Pat. No. 5,971,368.

(51) Int. Cl.$^7$ ................................................ B01F 3/04
(52) U.S. Cl. ...................... 261/121.1; 134/37; 134/198; 134/902; 261/122.1; 261/DIG. 42; 261/DIG. 65; 210/760; 210/900
(58) Field of Search ...................... 261/64.3, 94, 121.1; 261/122.1, 124, DIG. 42, DIG. 65, DIG. 75; 210/760, 900; 134/1.3, 902, 34, 37, 198

(56) References Cited

U.S. PATENT DOCUMENTS

| 932,898 | A | 8/1909 | Place .......................... 204/176 |
|---|---|---|---|
| 1,149,254 | A | 8/1915 | Dumars .................. 422/186.11 |
| 2,812,861 | A | 11/1957 | Bickford ..................... 210/120 |
| 2,876,188 | A | 3/1959 | Thorp et al. ................. 204/176 |
| 3,555,783 | A | 1/1971 | Grimshaw ...................... 55/48 |
| 3,590,902 | A | 7/1971 | Walker et al. ................ 164/43 |
| 3,650,151 | A | 3/1972 | Drexel .................... 73/194 M |
| 3,653,182 | A | 4/1972 | Welch ........................... 55/53 |

(List continued on next page.)

FOREIGN PATENT DOCUMENTS

| EP | 0430904 A1 | * 11/1989 | |
|---|---|---|---|
| EP | 0363098 | 4/1990 | .......... G05D/23/19 |
| EP | 0380962 | 8/1990 | ............. C02F/1/78 |
| EP | 0428983 | 5/1991 | .......... H01L/21/00 |
| EP | 0548596 | 6/1993 | ......... H01L/21/306 |
| EP | 0550152 | 7/1993 | ............. C02F/1/78 |
| EP | 0587889 | 3/1994 | ......... H01L/21/304 |
| EP | 0640933 | 8/1995 | ............ G06K/9/20 |

(List continued on next page.)

OTHER PUBLICATIONS

* References X'd were cited in at least one of the parent cases SNs 08/960,277 and 09/248,874.*
Kenens, et al., *Efficiency of Ozonated DI Water in Removing Organic Contamination*, 10 pages, Undated.
Fukazawa, et al., *An HF–O$_3$ Aqueous Solution for Silicon Wafer Cleaning*, pp. 267–270, Undated.
Takano et al., *Chemical Oxide Passivation for Very Thin Oxide Formation*, Mat. Res. Soc. Symp. Proc. vol. 315, 1993, pp. 381–386.

(List continued on next page.)

Primary Examiner—Richard L. Chiesa
(74) Attorney, Agent, or Firm—Kagan Binder PLLC

(57) ABSTRACT

A method for increasing the quantity of a gas, e.g., ozone, dissolved in a liquid, e.g., ultrapure deionized water, is provided. The gas to be dissolved is introduced to the liquid under pressure and the resulting admixture delivered to the end-use station under pressure. Thus, the method and system of the present invention are able to provide, e.g., ozonated water, continuously, efficiently and without cooling, thus providing a simple, cost efficient method of producing high concentration ozonated water for application to an in-process semiconductor wafer.

10 Claims, 4 Drawing Sheets

U.S. PATENT DOCUMENTS

| | | | |
|---|---|---|---|
| 3,890,176 A | 6/1975 | Bolon | 156/2 |
| 3,921,002 A | 11/1975 | Williams et al. | 250/533 |
| 3,935,041 A | 1/1976 | Goffredo et al. | 156/18 |
| 4,051,886 A | 10/1977 | Ross | 164/16 |
| 4,105,725 A | 8/1978 | Ross | 261/122 |
| 4,172,786 A * | 10/1979 | Frosch et al. | 210/696 |
| 4,176,206 A | 11/1979 | Inoue | 427/82 |
| 4,220,460 A | 9/1980 | Partus | 65/3 A |
| 4,276,243 A | 6/1981 | Partus | 261/128 |
| 4,393,013 A | 7/1983 | McMenamin | 261/64 B |
| 4,483,826 A | 11/1984 | Louthan | 422/225 |
| 4,491,551 A | 1/1985 | Johnson | 261/76 |
| 4,507,253 A | 3/1985 | Wiesmann | 261/22 |
| 4,540,531 A | 9/1985 | Moy | 261/141 |
| 4,632,789 A | 12/1986 | Reid | 261/63 |
| 4,666,480 A | 5/1987 | Mann | 62/11 |
| 4,735,750 A | 4/1988 | Damann | 261/29 |
| 4,749,640 A | 6/1988 | Tremont et al. | 430/314 |
| 4,817,652 A * | 4/1989 | Liu et al. | 134/102.1 |
| 4,874,509 A | 10/1989 | Bullock | 210/169 |
| 4,885,047 A | 12/1989 | Ury et al. | 156/345 |
| 4,900,336 A | 2/1990 | Pittner et al. | 55/55 |
| 4,973,379 A | 11/1990 | Brock et al. | 156/640 |
| 5,014,727 A | 5/1991 | Aigo | 134/102 |
| 5,071,485 A | 12/1991 | Matthews et al. | 134/2 |
| 5,082,518 A | 1/1992 | Molinaro | 156/345 |
| 5,087,323 A | 2/1992 | Park | 156/646 |
| 5,100,521 A | 3/1992 | Schwarzl | 204/176 |
| 5,181,985 A * | 1/1993 | Lampert et al. | 438/748 |
| 5,186,841 A * | 2/1993 | Schick | 210/760 |
| 5,215,592 A | 6/1993 | Jackson | 134/1 |
| 5,221,423 A * | 6/1993 | Sugino et al. | 438/704 |
| 5,242,468 A | 9/1993 | Clark et al. | 29/25.01 |
| 5,246,556 A | 9/1993 | Sawamoto et al. | 204/176 |
| 5,278,104 A | 1/1994 | Kodera et al. | 437/250 |
| 5,342,415 A | 8/1994 | Wasinger et al. | 8/111 |
| 5,378,317 A * | 1/1995 | Kashiwase et al. | 438/704 |
| 5,407,426 A | 4/1995 | Spears | 4/24 |
| 5,415,191 A | 5/1995 | Mashimo et al. | 134/102.1 |
| 5,431,861 A * | 7/1995 | Nagahiro et al. | 261/140.1 |
| 5,447,640 A * | 9/1995 | Omi et al. | 210/748 |
| 5,460,705 A | 10/1995 | Murphy et al. | 204/252 |
| 5,464,480 A * | 11/1995 | Matthews | 134/1.3 |
| 5,503,708 A | 4/1996 | Koizumi et al. | 156/643.1 |
| 5,565,149 A | 10/1996 | Page et al. | 261/140.1 |
| 5,569,180 A | 10/1996 | Spears | 604/24 |
| 5,591,349 A | 1/1997 | Ikeda et al. | 210/760 |
| 5,624,734 A | 4/1997 | Rees et al. | 422/186.11 |
| 5,626,769 A | 5/1997 | Sawamoto | 210/760 |
| 5,632,847 A | 5/1997 | Ohno et al. | 156/344 |
| 5,674,410 A * | 10/1997 | Nakajima et al. | 216/92 |
| 5,676,760 A | 10/1997 | Aoki et al. | 134/1.3 |
| 5,714,203 A | 2/1998 | Schellenberger et al. | 427/378 |
| 5,735,076 A | 4/1998 | Masui et al. | 47/58 |
| 5,735,934 A | 4/1998 | Spears | 75/414 |
| 5,756,054 A | 5/1998 | Wong et al. | 422/186.08 |
| 5,776,296 A | 7/1998 | Matthews | 156/345 |
| 5,843,307 A | 12/1998 | Faivre et al. | 210/192 |
| 5,896,875 A | 4/1999 | Yoneda | 134/102.3 |
| 5,897,832 A | 4/1999 | Porter | 422/28 |
| RE36,290 E | 9/1999 | Clark et al. | 29/25.01 |
| 5,971,368 A * | 10/1999 | Nelson et al. | 261/64.3 |
| 6,076,808 A | 6/2000 | Porter | 261/53 |
| 6,080,531 A * | 6/2000 | Carter et al. | 430/329 |
| 6,080,631 A | 6/2000 | Kitahata | 430/341 |
| 6,315,942 B1 | 11/2001 | Spears et al. | 266/89 |
| 6,488,271 B1 * | 12/2002 | Nelson et al. | 261/121.1 |

FOREIGN PATENT DOCUMENTS

| | | | |
|---|---|---|---|
| EP | 0702399 | 9/1995 | H01L/21/306 |
| EP | 0867924 | 9/1998 | H01L/21/306 |
| GB | 1545559 | 5/1979 | B01F/3/04 |
| JP | 60114393 | 6/1985 | C02F/1/72 |
| JP | 62221426 | 9/1987 | B01F/5/06 |
| JP | 01130785 | 5/1989 | C02F/1/78 |
| JP | 01257103 | 10/1989 | C01B/13/10 |
| JP | 01306787 | 12/1989 | F25C/1/00 |
| JP | 03089995 | 4/1991 | C02F/1/78 |
| JP | 03154690 | 7/1991 | C02F/1/78 |
| JP | 04346895 | 12/1992 | C02F/1/78 |
| JP | 06182366 | 7/1994 | C02F/1/78 |
| JP | 06277476 | 10/1994 | B01F/1/00 |
| JP | 08045886 | 2/1996 | H01L/21/304 |
| WO | WO96/01593 | 1/1996 | A61B/19/00 |
| WO | WO97/26308 | 7/1997 | C09K/3/00 |
| WO | WO98/46340 | 10/1998 | B01F/3/04 |
| WO | WO99/52654 | 10/1999 | B08B/3/12 |

OTHER PUBLICATIONS

Tong et al., *Aqueous Ozone Cleaning of Silicon Wafer*, FSI International Technical Report TR 376, Oct. 7, 1991, 7 pages.

Wei, et al., *Ozone use for post–ashing resist stripping: Mechanisms and recent findings*, 1997 Semiconductor Pure Water and Chemicals Conference pp. 81–97.

Ohmi, *Very High quality thin gate oxide formation technology* J. Vac. Sci. Techno. vol. 13, No. 3, 1995, pp. 1665–1670.

Kogure et al, *Ozonized Ultrapure Water Treatment of Organic Contamination on Si–Wafer Surface*, Institute of Environmental Sciences 1993 Proceedings, vol. 1, pp. 380–385.

Hoigne et al., *The Role of Hydroxyl Radical Reactions in Ozonation Processes in Aqueous Solutions*, Water Research vol. 10, 1976, pp. 337–386.

\* cited by examiner

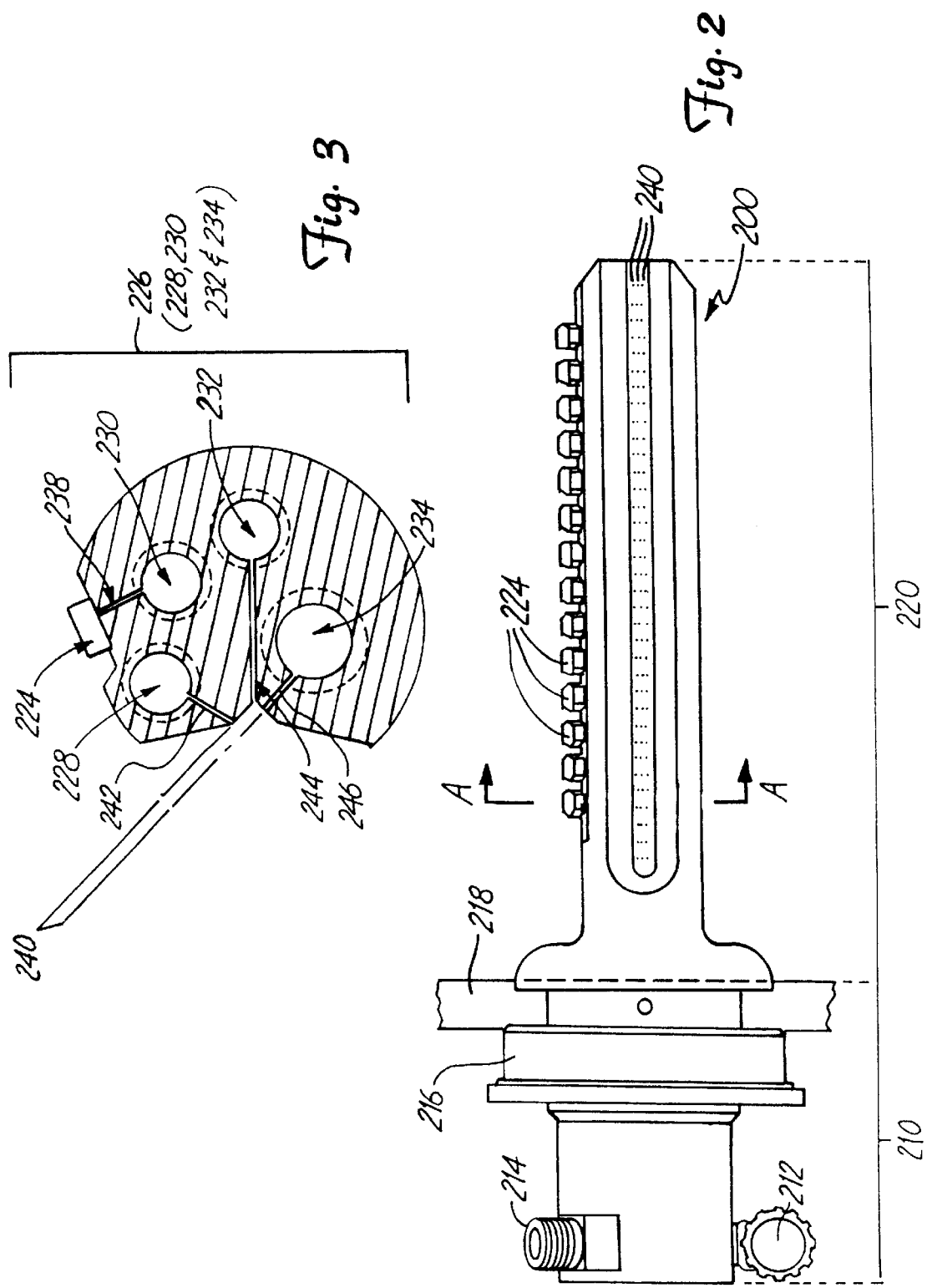

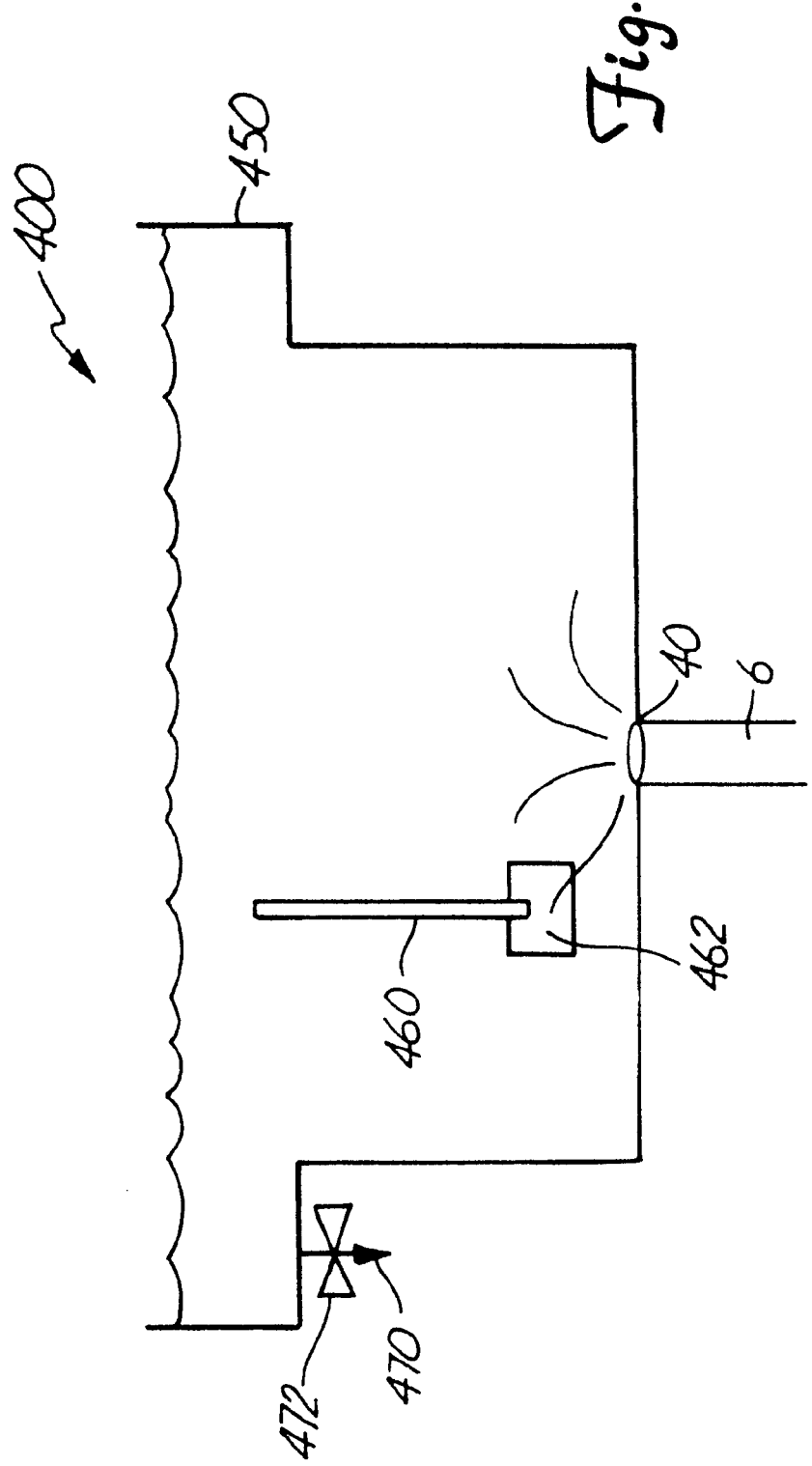

METHOD TO INCREASE THE QUANTITY OF DISSOLVED GAS IN A LIQUID AND TO MAINTAIN THE INCREASED QUANTITY OF DISSOLVED GAS IN THE LIQUID UNTIL UTILIZED

REFERENCE TO RELATED APPLICATION

This application is a continuation of application Ser. No. 09/248,874, filed Feb. 11, 1999, now issued as U.S. Pat. No. 6,488,271, which is a division of application Ser. No. 08/960,277, filed Oct. 29, 1997, now issued as U.S. Pat. No. 5,971,368, the disclosures of which are hereby incorporated by reference in their entirety.

FIELD OF THE INVENTION

This invention relates to a method and system for increasing the quantity of dissolved gas in a liquid and maintaining a substantial amount of the increased quantity of dissolved gas in solution until the gas/liquid solution is delivered to a point of use. More particularly, the invention relates to a method and system of increasing the quantity of dissolved gas in a liquid by using pressurized mixing and delivery of the gas and the liquid. Furthermore, by subjecting the gas/liquid solution to controlled dispensing at a point of use, a substantial quantity of the increased quantity of gas is maintained in solution.

BACKGROUND OF THE INVENTION

Ozone has long been recognized as a useful chemical commodity valued particularly for its outstanding oxidative activity. In fact, ozone is the fourth strongest oxidizing chemical known, having an oxidation potential of 2.07 volts. Because of this property, ozone and/or fluid mixtures including ozone are capable of removing a wide variety of contaminants, such as cyanides, phenols, iron, manganese, and detergents, from surfaces. Also, ozone and/or fluid mixtures including ozone are capable of oxidizing surfaces. In particular, ozonated water is used to "clean", i.e., oxidize, the surface of silicon wafers in-process in the semiconductor industry. Additionally, ozone is also useful for inhibiting, reducing and/or eliminating the accumulation of biomass, mold, mildew, algae, fungi, bacterial growth and scale deposits in various aqueous solution systems. When used in this manner, ozonation provides the advantage of producing a lesser quantity of potentially harmful residues than, e.g., chlorination, which leaves undesirable chlorinated residues in aqueous systems.

Because of this wide range of activity, ozone finds application in many diverse processes. Ozone, for example, has been used as a biocide for the treatment of drinking water. Additionally, ozone is used for sterilization in the brewing industry, and for odor control purposes in the sewage treatment industry. Finally, ozonated water finds wide utility in the semiconductor industry, where for example, ozone is used to clean and surface condition in-process silicon wafers. Additionally, as is described in U.S. Pat. No. 5,378,317, ozonated water is used to remove organic materials, such as photoresist, from the surface of silicon wafers. Moreover, ozonated water is used in the semiconductor industry to form a thin, passivating oxide layer on the surface of silicon wafers.

The use of ozonated water provides several advantages in these applications. First of all, because ozonated water is generated at the point of use, it is free of contaminants, i.e., particles and metals, that are typically present in chemicals that are stored in barrels or drums. Ozonated water is also less expensive than other oxidizing chemicals and furthermore, since ozonated water naturally decomposes, the use of ozonated water presents no disposal issues. However, the effectiveness of ozone in each of these applications is adversely affected by its low solubility and short-half life (approximately 10 minutes) in aqueous solutions. That is, not only is it difficult to dissolve ozone in an aqueous solution, but also, once dissolved, it is difficult to maintain the ozone in solution.

Although several methods of increasing the quantity of dissolved ozone in aqueous solutions are known, each of these prior art methods has limitations that render them inadequate for certain applications. For example, bubbling ozone directly into water at ambient pressure has been used as a method to dissolve ozone in aqueous solutions. Such a technique, however, does not optimize the quantity of ozone dissolved, since the ozone bubbles effervesce before a substantial amount of ozone can be dissolved into solution and/or before the ozonated water can be applied to the surface to be treated.

Additionally, published European patent application No. EP 0 430 904 A1 discloses a process for producing ozonated water comprising the step of contacting, within a vessel of defined volume, an ozone-containing gas with fine droplets of water. However, this process is less than optimal since it provides limited contact between the ozone-containing gas and water. That is, as the vessel fills with water, the time of contact between the ozone containing gas and the fine water droplets is shortened, resulting in a lesser quantity of ozone being dissolved into solution. Additionally, this application does not teach a method of keeping the ozone in solution until it is delivered to a point of use. Thus, it is possible that, upon delivery, a large quantity of the ozone dissolved in solution will effervesce, and the benefits of the mixing process will be lost.

Finally, several methods utilizing cooling to increase the quantity of dissolved ozone in aqueous solutions have also been proposed. For example, U.S. Pat. No. 5,186,841 discloses a method of ozonating water comprising injecting ozone through an aqueous stream across a pressure drop of at least 35 psi. The ozonated stream is then combined with a second stream that is preferably a portion of an aqueous solution which is recirculating in a cooling water system. The resultant stream is forced to flow at a velocity of 7 feet per second for a distance sufficient to allow 70% of the ozone to be absorbed. Additionally, U.S. Pat. No. 4,172,786 discloses a process for increasing the quantity of dissolved ozone in an aqueous solution by injecting an ozone containing gas into a side stream conduit which circulates a portion of cooling water. The ozone-injected water is then mixed with the cooling water in a tower basin, thereby ozonating the water. Finally, U.S. Pat. No. 5,464,480 discloses a process for removing organic materials from semiconductor wafers using ozonated water. Specifically, this patent teaches that high ozone concentration water, suitable for use in the disclosed process may be obtained by mixing ozone and water at a temperature of from about 1° C. to 15° C.

Although the systems disclosed in U.S. Pat. Nos. 5,186,841, 4,172,786 and 5,464,480 claim to increase the quantity of dissolved ozone in water, it is more likely that much of the ozone effervesces to the atmosphere and/or is converted to oxygen rather than being dissolved in the water. Thus, these systems would require the use of a large amount of ozone, which would, in turn, render them costly. Additionally, these patents do not disclose methods for optimizing the ozone concentration at the point of use, and as a result, it is possible that the increased ozone, if any, that is dissolved as a result of cooling the solution, will effervesce out of solution at the point of use.

Thus, there is a need for an efficient method of increasing the quantity of ozone that may be dissolved and maintained in aqueous solution to a point of use, not only to minimize the amount of ozone used, but also to provide sufficiently ozonated aqueous solutions for given applications.

SUMMARY OF THE INVENTION

According to the present invention, the above objectives and other objectives apparent to those skilled in the art upon reading this disclosure are attained by the present invention which is drawn to a method and system for increasing the quantity of dissolved gas in a liquid and for optimizing the amount of dissolved gas that remains in solution to a point of use. More specifically, it is an object of the present invention to provide a method and system for increasing the quantity of dissolved ozone in an aqueous solution, and furthermore, for maintaining the dissolved ozone in solution when delivered to a point of use. In this manner, the present invention provides an exceptionally efficient method and system for producing and using high concentration ozonated water.

Generally, the method involves introducing a stream of a gas to be dissolved into a pressurized vessel wherein the gas is contacted with, and dissolves in, an amount of liquid. Mixing the gas to be dissolved with the liquid under pressure results in an increased amount of gas being dissolved, relative to the amount of dissolution that occurs at atmospheric pressure. The resulting admixture comprising the liquid and the dissolved gas is then delivered to a point of use through a pressurized conduit, which maintains the increased amount of dissolved gas in solution.

At the point of use, the admixture is subjected to controlled dispensing. That is, the admixture is dispensed under sufficiently gentle conditions such that the dispensed admixture comprises a supersaturated quantity of dissolved gas at the time the admixture contacts the substrate. Preferably, the admixture is dispensed under conditions such that the resulting delivered volume of admixture has a relatively small surface area/volume ratio. By virtue of the small surface area/volume ratio, the amount of diffusion of the dissolved gas out of the liquid is limited, thus maintaining an increased concentration of dissolved gas in the liquid to a point of use. In contrast, when the surface area/volume ratio is relatively large, the dissolved gas diffuses out of solution more quickly. Thus, dispense methods which result in delivered volumes of admixture with a large surface area/volume ratio also result in delivered volumes with a decreased concentration of dissolved gas at the point of use.

Several methods of controlled dispensing are suitable for use in the present invention. For example, at the point of use, the admixture may be subjected to controlled atomization. Specifically, the admixture may be atomized under conditions such that the average size of the resulting droplets is large (i.e., the surface area/volume ratio is small) relative to the size of droplets created by conventional atomization. That is, conventional atomization typically produces a fine mist, i.e., small droplets with a relatively large surface area/volume ratio. Thus, the dissolved gas will diffuse out of solution more quickly resulting in a decreased concentration of dissolved gas at the point of use. In contrast, the controlled atomization utilized in the method and system of the present invention results in large droplets with a smaller surface area/volume ratio, thus limiting the amount of diffusion that takes place and maintaining an increased concentration of dissolved gas in solution to a point of use. Controlled atomization may be effected by a number of mechanisms. For example, in a preferred embodiment, the admixture may be "gently" impinged with either a second stream of admixture or a stream of inert gas, e.g., nitrogen, in a manner that results in the desired droplet size.

The controlled dispensing may also be effected by delivering the admixture through a fan structure at the point of use. When controllably dispensed in this manner, the fan nozzle breaks the stream of admixture into smaller sheets or large droplets of admixture, thus resulting in delivered volumes of admixture with the desired small surface area/volume ratio.

Yet another example of a controlled dispensing method suitable for use in the present invention includes gently dispensing the admixture as a steady stream. In this embodiment of the invention, the admixture may be dispensed directly to the point of use, e.g., the surface of a silicon wafer, or alternatively, the admixture may be gently dispensed into a suitably sized vessel, i.e., a vessel with a small open surface area, but yet a large volume. That is, the desired small surface area/volume ratio may be achieved simply by gently dispensing the admixture into a vessel with suitable dimensions so as to result in the desired surface area/volume ratio.

In a preferred embodiment, the liquid utilized in the method and system of the present invention is a fluorinated liquid, sulfuric acid, hydrochloric acid, hydrofluoric acid, water, ultrapure deionized water or combinations thereof. More preferably, the liquid utilized is water or ultrapure deionized water. Additionally, the method and system of the present invention are applicable to a variety of cleaning gases, including, but not limited to, hydrogen chloride, nitrogen, carbon dioxide, oxygen, hydrogen fluoride, ammonium hydroxide, ozone or combinations thereof. In a particularly preferred embodiment, the method and system are used to increase the quantity of dissolved ozone gas in ultrapure deionized water.

As a result of the ability of the method and system of the present invention to increase and maintain the quantity of dissolved cleaning gas in a liquid, the resulting admixtures are expected to be particularly useful in the treatment of various surfaces. In particular, ozonated water prepared with the method and/or system of the present invention is effective to clean, i.e., oxidize and/or remove organic contaminants and/or photoresist materials, from surfaces such as in-process silicon wafers. In this regard, the present invention also provides a method for treating surfaces with a cleaning gas. Specifically, the method comprises the steps of preparing an admixture comprising a cleaning gas dissolved in a liquid within a pressurized vessel and transferring the admixture to an outlet through a pressurized conduit. The admixture is then dispensed through the outlet under sufficiently gentle conditions such that the dispensed admixture comprises a supersaturated quantity of dissolved gas at the time the admixture contacts the substrate.

The system provided by the present invention generally comprises a pressurized vessel and an outlet coupled to the pressurized vessel adapted to dispense a stream of the admixture comprising the liquid and the dissolved gas under sufficiently gentle conditions such that the dispensed admixture comprises an increased quantity of dissolved gas relative to admixture produced and dispensed by conventional methods. In one preferred embodiment, the outlet comprises a spray post comprising at least one fixed orifice located at a suitable point in a treatment vessel (e.g., a wet bench) such that admixture may be gently dispensed thereinto. Preferably, the treatment vessel is of dimensions that result in a small surface area/volume ratio of the dispensed admixture, so that diffusion of the gas out of the liquid is minimized. In a second preferred embodiment, the outlet comprises a spray post comprising a single fixed orifice located a suitable distance from a point of use such that a steady stream of admixture may be gently dispensed thereonto. In a third embodiment, the spray post may comprise a plurality of one or more sets of fixed orifices distributed along at least one surface of the spray post at suitable intervals to effect the atomization of a stream of the admixture by impingement with at least a second fluid stream. The second fluid stream preferably may either be a gas stream or a second stream of the admixture. Finally, in a fourth preferred embodiment, the outlet may comprise a spray post comprising a plurality of fan structures distributed along at least one surface, the fan structures being effective to break up a stream of the admixture into sheets and/or large droplets with the desired small surface area/volume ratio.

Preferably, the system further comprises a liquid sensing device operatively coupled to the pressurized vessel, a liquid source responsive to the liquid sensing device, a gas source capable of delivering a generally continuous supply of gas to the pressurized vessel, a pressurized liquid outlet conduit fluidly coupled to the pressurized vessel and a pressurized gas outlet conduit through which undissolved gas can exit the pressurized vessel. Additionally, in a preferred embodiment, the pressurized gas outlet conduit can be used to restrict the flow of undissolved gas out of the pressurized vessel, thus maintaining pressure in the pressurized vessel and aiding in the motivation of admixture from the pressurized vessel through the pressurized liquid outlet conduit. In a preferred embodiment, the pressurized vessel also comprises an amount of a flow impediment effective to increase the residence time of the gas in the pressurized vessel. For example, the pressurized vessel may comprise packing material, such as a fluorinated polymer, quartz, sapphire or combinations thereof, or baffles.

As used herein, the term "aqueous" means any fluid admixture that contains water as a solvent, including impure water. The term "supersaturated" is meant to indicate that a liquid contains a greater amount of a dissolved constituent than is present in a saturated solution of the same components at the same temperature and pressure. As used herein, the term "ozonated" means that ozone is dissolved in a given liquid. The phrase "ultrapure deionized water", as used herein, is meant to indicate water that has been treated by filtering, reverse osmosis, and UV sterilization so as to remove particles, metals and organics, respectively. The phrase "controlled dispensing" or "controllably dispensed" is meant to indicate a method of dispensing admixture under sufficiently gentle conditions such that the dispensed admixture comprises a supersaturated quantity of dissolved gas at the time the admixture contacts a substrate. Preferably, the phrase "controlled dispensing" or "controllably dispensed" is meant to indicate a method of dispensing that results in a delivered volume of admixture of a sufficiently small surface area/volume ratio so that the increased quantity of dissolved gas is maintained in solution until delivery to a point of use. The phrase "generally continuous supply" as applied to a gas source is meant to indicate a gas source capable of generating a gas from suitable precursors or a gas source such as tanks, cylinders, and the like, for use in a steady state process as opposed to a batchwise process. Finally, the phrase a "continuous process" refers to a process that can be operated by supplying input materials and withdrawing output materials under substantially steady state conditions after start-up and prior to shutdown.

BRIEF DESCRIPTION OF THE FIGURES

The above mentioned and other advantages of the present invention, and the manner of attaining them, will become more apparent and the invention itself will be better understood by reference to the following description of the embodiments of the invention taken in conjunction with the accompanying drawing, wherein:

FIG. 2 is a side view of a spray nozzle suitable for use as the outlet in the system illustrated in FIG. 1.

FIG. 3 is an enlarged cross-sectional view taken along line A—A of FIG. 2.

FIG. 4 is a diagram of a representative controlled dispensing system suitable for attachment to the outlet in the system illustrated in FIG. 1.

DETAILED DESCRIPTION OF THE INVENTION

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

The present invention represents an improvement in producing liquids comprising a dissolved gas. Applicants have discovered that, by introducing a gas into a pressurized vessel containing a liquid, delivering the resulting admixture to a point of use through a pressurized conduit, and subjecting the admixture to controlled dispensing at the point of use, the quantity of dissolved gas in the liquid is not only enhanced over the quantity of dissolved gas in the liquid at atmospheric pressure, but also, that a substantial portion of the enhanced amount of dissolved gas stays in solution to the point of use.

Figure 1:
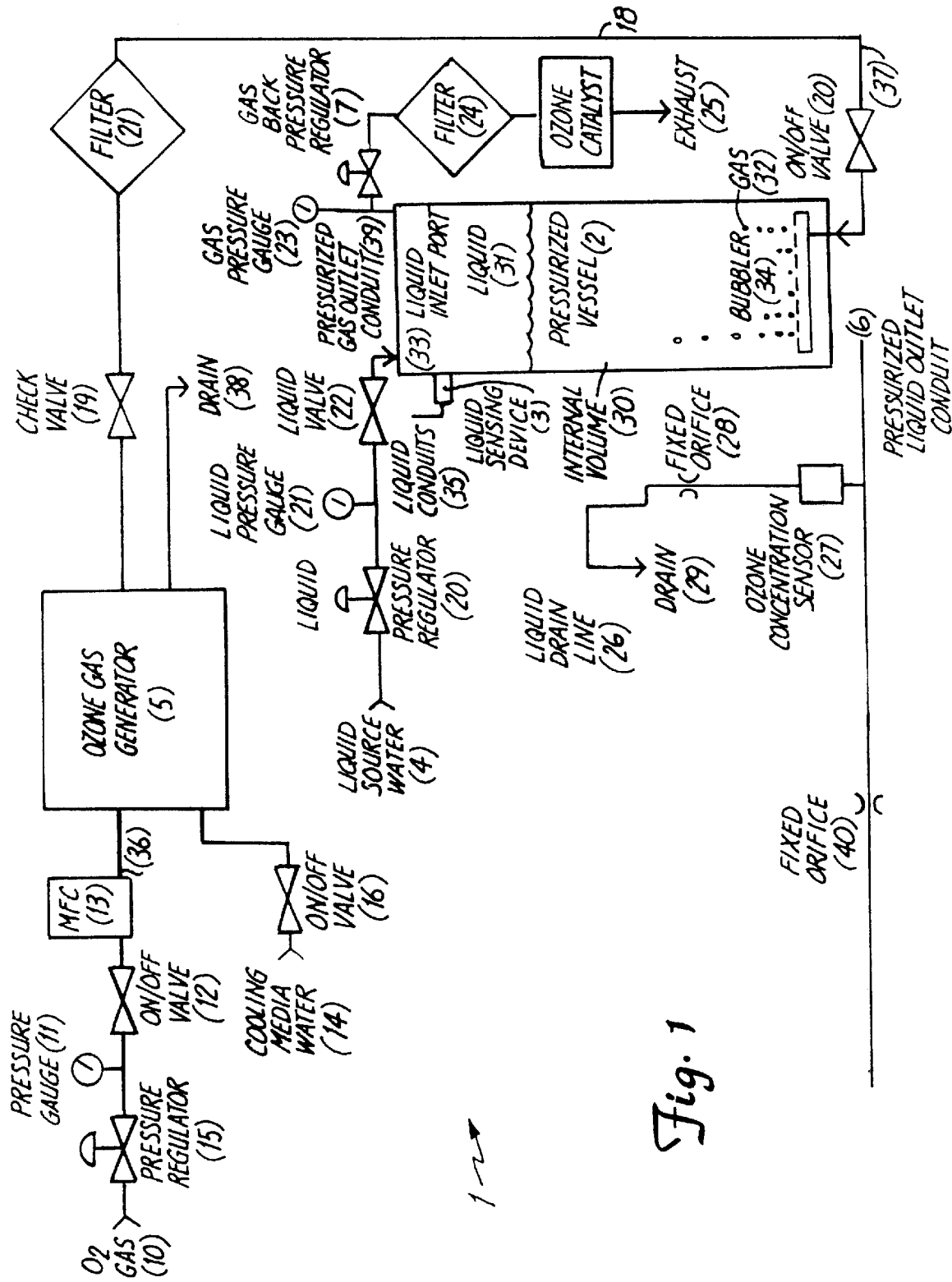
FIG. 1 is a diagram of one representative system capable of producing the liquid comprising a dissolved gas in accordance with the present invention.

Referring now to FIG. 1, there is illustrated a system (1) embodying the principles of the present invention. System (1), as illustrated, is adapted for the production of ozonated water, however, the principles of the present invention are applicable to any liquid/gas solution. System (1) generally comprises a pressurized vessel (2) having an internal volume (30) within which a body of liquid (31) is contacted with a gas (32). Gas (32) is dissolved in liquid (31) as a result of such contact. Liquid (31) is supplied to pressurized vessel (2) through liquid inlet port (33) at the top of pressurized vessel (2), and gas (32) enters the pressurized vessel (2) through bubbler (34) positioned at the bottom of pressurized vessel (2). Thus, gas (32) percolates upward through pressurized vessel (2) while liquid (31) generally flows downward. Such counterflow of gas (32) and liquid (31) provides a relatively long period of contact between gas (32) and liquid (31), thereby facilitating the dissolution of gas (32) in liquid (31).

To further increase the period of contact between gas (32) and liquid (31), the internal volume (30) of pressurized vessel (2) may include a conventional flow impediment (not illustrated). That is, the internal volume (30) of pressurized vessel (2) may contain an amount of packing material and/or baffles sufficient to provide an increased period of contact between gas (32) and liquid (31). Examples of packing materials suitable for use in the present invention include, but are not limited to, quartz, sapphire, fluorinated polymers or combinations thereof. For example, depending upon pressure, gas (32) may flow through a vessel (2) that is 1 meter high in approximately 2 seconds. However, in a vessel (2) of the same height, flow impediments can increase this residence time by at least a factor of two. That is, a vessel (2) that is 1 meter high and packed with flow impediment will have a residence time of from about 5 to 10 seconds.

Applicants' invention is based, at least partially, on Henry's Law, which states that all other things being constant, as the pressure at the interface between a liquid and a gas increases, the quantity of gas in the liquid increases. In other words, greater quantities of gas can be dissolved in pressurized liquids than can be dissolved in the same liquids at lower pressures. While higher pressures within the pressurized vessel (2) will result in an increased quantity of ozone being dissolved into solution, the pressure of pressurized vessel (2) is generally constrained by the safety considerations involved in operating a manufacturing process in which hazardous chemicals may be involved. It is therefore preferred that the pressure in the pressurized vessel (2) be maintained at a level of from about 1.1 to about 10 atmospheres. More preferably, the pressure of pressurized vessel (2) is maintained at a level of from about 2 to about 5 atmospheres. Most preferably, the pressure of pressurized vessel (2) is from about 2 to about 3 atmospheres.

The method and system of the present invention may be easily adapted to accommodate liquids and/or gases that are corrosive. Thus, given that ozonated water is corrosive, pressurized vessel (2) and any flow impediment included in the internal volume (30) of pressurized vessel (2) are preferably constructed of a material, such as polytetraflouroethylene (commercially available under the trade designation Teflon® PTFE from E. I. DuPont deNemours & Co, Wilmington, Del.) resistant to the deteriorating effects of corrosive chemicals.

Pressurized vessel (2) is connected to liquid source (4) by liquid conduit (35) for supplying the desired liquid to the pressurized vessel (2). In a preferred embodiment, liquid source (4) supplies ultrapure deionized water through liquid conduit (35) to pressurized vessel (2). Optionally, liquid conduit (35), may comprise liquid pressure regulator (20) and liquid pressure gauge (21) to control the pressure of liquid (31) flowing to pressurized vessel (2). Flow from liquid source (4) into pressurized vessel (2) is further preferably controlled by liquid valve (22) that is responsive to liquid sensing device (3). Liquid sensing device (3) is positioned on pressurized vessel (2) such that liquid sensing device (3) is capable of detecting an amount of liquid (31) in the pressurized vessel (2). In this manner, the transport of the liquid from the liquid source (4) to the pressurized vessel (2) may be controlled in response to a signal from the liquid sensing device (3)

The rate of flow of liquid from the liquid source (4) to the pressurized vessel (2) is not critical to the practice of the present invention and may be set at any convenient level. Generally speaking, the rate of liquid flow may range from 1 liter/minute to 25 liters/minute. Additionally, although FIG. 1 shows a preferred configuration in which the liquid source (4) is connected to the pressurized vessel (2) at the top of the pressurized vessel (2), the liquid source (4) may be connected to the pressurized vessel (2) at any other desired location or multiple locations. However, connection at the top of pressurized vessel (2) is generally preferred as such connection facilitates the counterflow contact between gas (32) and liquid (31).

It is further preferred that a pressure differential exist between liquid source (4) and pressurized vessel (2) to ensure that the flow of liquid (31) is maintained in the desired direction, i.e., into pressurized vessel (2). However, a large pressure differential is not required. It is sufficient, for example, if pressurized vessel (2) is at 2.5 atmospheres, that the liquid (31) flowing from liquid source (4) is at a pressure of 2.6 atmospheres. It is additionally preferred that a pressure differential exist between gas source (10) and pressurized vessel (2) to ensure that the flow of gas (32) is maintained in the desired direction, i.e., into the pressurized vessel (2). Again, a large pressure differential is not required, that is, it is sufficient if pressurized vessel (2) is at 2.5 atmospheres, that gas (32) flowing from gas source (10) is at a pressure of 2.6 atmospheres.

Ozone is supplied to pressurized vessel (2) through pressurized gas conduit (18). Since ozone has a relatively short half life, it is preferred that it be supplied on demand from, e.g., ozone gas generator (5). However, any ozone source capable of maintaining a generally continuous flow of ozone may be used. In the embodiment shown, the ozone gas generator (5) is of the type that uses electricity to generate ozone from oxygen. Oxygen is supplied from an oxygen gas facility (10) to ozone gas generator (5) through conduit (36). Conduit (36) comprises a precursor supply pressure regulator (15), a precursor supply pressure gauge (11), a precursor supply 2-way valve (12) and a precursor supply mass flow controller (13). These fixtures are included to control the flow rate of oxygen, however, neither the fixtures nor their configuration are considered critical to the practice of the present invention. Cooling media (14), preferably water, is supplied to the ozone gas generator (5) through a cooling media valve (16). Cooling media (14) flows through ozone gas generator (5) and exits through cooling media drain (38).

The ozone generated from the gas source (5) is supplied to the pressurized vessel (2) through pressurized gas conduit (18). Given that ozone gas is corrosive, pressurized gas conduit (18) is preferably constructed of a material resistant to the deteriorating effects of ozone. For example, pressurized gas conduit (18) may be constructed of stainless steel, quartz, or a fluorinated polymer such as Teflon® PFA or Teflon® PTFE, commercially available from E. I. DuPont deNemours & Co., Wilmington, Del. Furthermore, since ozone is more corrosive in a wet environment, it is preferred that, at some point near the pressurized vessel (2), such as the point labeled (37) in FIG. 1, where the collection of moisture is possible, that pressurized gas conduit (18) is constructed of a material resistant to wet ozone, such as a fluorinated polymer (i.e., Teflon® PFA or Teflon® PTFE).

A gas check valve (19) may be provided in pressurized gas conduit (18) to ensure that the flow of the ozone through the system proceeds in one direction, i.e., towards the pressurized vessel (2). Any type of valve capable of ensuring unidirectional flow may be used, for example, a ball and socket valve is suitable for use as the pressurized gas check valve (19). Additionally, a pressurized gas 2-way valve (20) may be provided in pressurized gas conduit (18) as another method of controlling the flow of the ozone from the ozone gas generator (5). Finally, pressurized gas conduit (18) may further comprise a gas filter (21) suitable for removing particulates from the ozone gas. Any type of filter may be used, the only requirement being that the fitter material must be resistant to ozone. Examples of filters suitable for use in the system of the present invention include hydrophobic membrane filters, such as those commercially available from Pall Ultrafine Filtration Company, East Hills, N.Y.

Although FIG. 1 shows a preferred configuration in which pressurized gas conduit (18) is attached to the pressurized vessel (2) at the bottom of the vessel, pressurized gas conduit (18) may be attached to pressurized vessel (2) in any other desired location(s). However, it is generally preferable that pressurized gas conduit (18) be attached at the bottom of pressurized vessel (2) so as to maximize the counterflow contact of liquid (31) and gas (32). Additionally, as illustrated in FIG. 1, the ozone gas is preferably bubbled into the pressurized vessel (2). That is, the ozone gas stream may be directed through a bubbler (34). However, although bubbling the ozone into pressurized vessel (2) is preferred, the ozone may be introduced into the pressurized vessel (2) in a variety of manners, e.g., as a steady stream, such as through a frit made of an ozone resistant material, such as quartz or sapphire.

In addition to the two inlet conduits to the pressurized vessel (2) (i.e., the liquid conduit (35) and the pressurized gas conduit (18)), there are preferably two outlet conduits positioned on the pressurized vessel (2). Specifically, there is preferably positioned on the pressurized vessel (2) a pressurized gas outlet conduit (39) and a pressurized liquid outlet conduit (6).

Pressurized gas outlet conduit (39) is coupled to the pressurized vessel (2) such that undissolved gas can be withdrawn from the pressurized vessel (2). Pressurized gas outlet conduit (39) preferably comprises gas back pressure regulator (7), so that pressure within the pressurized vessel (2) is maintained within the desirable ranges described above. Optionally, the pressurized gas outlet conduit (39) may comprise a gas pressure gauge (23), an exhaust system (25) comprising an ozone catalyst which converts ozone to oxygen and thus ensures that no ozone gas escapes the system, and a gas filter (24) to prevent the back flow of contaminants from the exhaust system (25). These fixtures, although desirable, are not critical to the practice of the present invention.

The second outlet conduit positioned on pressurized vessel (2) is preferably a pressurized liquid outlet conduit (6) positioned such that an amount of the liquid comprising an amount of dissolved gas can be withdrawn from the pressurized vessel (2). As is illustrated in FIG. 1, liquid/gas admixture is dispensed from the pressurized liquid outlet conduit (6) preferably through outlet (40), which may preferably comprise one or more fixed orifices, said orifices being of a size effective to maintain a desired amount of pressure of the liquid/dissolved gas admixture in the pressurized liquid outlet conduit (6) until the liquid is dispensed through outlet (40). In a preferred embodiment, the outlet (40) comprises a spray post with a plurality of fixed orifices dispersed along at least one surface at suitable intervals to accomplish the desired dispensing and surface treatment. The shape of the orifices is not critical to the practice of the present invention and thus the orifice may be square, rectangular, elliptical or circular. In a preferred embodiment, the outlet (40) comprises a plurality of fixed orifices that are circular and are of diameter from about 0.02 to 0.05 inches (i.e., from about 0.51 to 1.27 mm) in diameter.

The configuration of pressurized gas outlet (39) helps motivate admixture from pressurized vessel (2) through pressurized liquid outlet conduit (6). Specifically, the flow of undissolved gas exhausted through pressurized gas outlet conduit (39) is restricted sufficiently to maintain a back pressure with respect to pressurized vessel (2). This back pressure helps push admixture out of pressurized vessel (2) through pressurized liquid outlet conduit (6). As is shown, back pressure regulator (7) is used to restrict gas flow through pressurized gas outlet conduit (39), but any other kind of suitable flow restriction componentry could be used as desired. With the development of this back pressure, mechanical pumps are not required to transport admixture from pressurized vessel (2) to a point of use, thus reducing the cost and complexity of system (1).

Additionally, the flow of gas through pressurized gas outlet conduit (39) may be adjusted to help regulate the flow rate of admixture through pressurized liquid outlet conduit (6). For example, as the flow of gas through pressurized gas outlet conduit (39) is restricted, back pressure in pressurized vessel (2) increases as does the motivating force against the admixture. Accordingly, the greater the flow restriction that is established through pressurized gas outlet conduit (39), the greater the flow rate of admixture will be through pressurized liquid outlet conduit (6). Conversely, the lesser the flow restriction through pressurized gas outlet conduit (39), the lesser the flow rate of admixture will be through pressurized liquid outlet conduit (6).

The pressurized liquid outlet conduit (6) may further comprise a liquid drain line (26) through which a relatively minor flow of admixture can be drawn so that system (1) can be continuously operated, even absent demand for admixture from outlet (40). Additionally, drain line (26) provides a convenient location to place an ozone concentration sensor (27), by which the ozone concentration of the admixture can be monitored.

The flow rate through drain line (26) is preferably maintained at such a rate that system (1) may be kept operational, but at a low enough rate so that excessive amounts of water and ozone are not wasted. For example, for a system in which ozone flow into pressurized vessel (2) is 1.0 to 25.0 l/min, flow through drain line (26) is suitably established at 0.2 to 1.0 l/min. Preferably, flow through drain line (26) will remain constant at from about 0.4 l/m to about 0.6 l/m. Furthermore, in addition to concentration sensor (27), drain line (26) comprises a fixed orifice (28) for limiting the flow of ozonated water through the ozone concentration sensor (27). Additionally, if drain line (26) is to be employed, it is preferred that drain (29) be included on drain line (26).

Referring now to FIGS. 2 and 3, there is illustrated a side view of a preferred embodiment of a spray post (200) suitable for use as outlet (40) as illustrated in FIG. 1 of the present invention. Generally, spray post (200) is configured to controllably atomize a stream of ozonated water under conditions such that relatively large droplets of the stream are formed and then allowed to contact with the surface to be treated. By subjecting the stream of ozonated water to controlled atomization in this way, a greater quantity of ozone remains in solution for more effective treatment of the surface. That is, the droplets created by controlled atomization would be supersaturated with ozone.

Spray post (200) is capable of achieving such atomization by relying upon the principles of stream impingement to gently atomize a stream of the ozonated water. More specifically, a stream of the ozonated water and one or more other streams (which can be another stream of ozonated water, a stream of a nonreactive gas, such as $N_2$ and/or some other fluid), can be impinged against each other under conditions such that the relatively large droplets are formed Spray post (200) is additionally capable of achieving a controlled dispensing of ozonated water by virtue of the utilization of a plurality of fan mechanisms. That is, the fan mechanisms would operate to break a stream of the ozonated water into sheets and/or relatively large droplets to be distributed onto the surface to be treated. Finally, spray post (200) is capable of controllably dispensing ozonated water as a steady stream, i.e., a stream of ozonated water may be caused to flow through one orifice (240) of a triad of orifices (240) without being impinged with another stream of fluid.

As illustrated, spray post (200) comprises mounting flange (210) and nozzle (220). Mounting flange (210) is adapted to be coupled to system (1) as illustrated in FIG. 1. Mounting flange (210) comprises admixture inlet (212) for receiving ozonated water produced by the system of the present invention, while gas inlet (214) is adapted to receive an atomizing gas from a suitable source. In preferred embodiments, the atomizing gas is an inert gas, such as nitrogen. Additionally, mounting flange (210) comprises nut (216) for attaching mounting flange (210) to a lid (218) (shown in part) of a vessel that would contain the items to be treated with the ozonated water.

Nozzle (220) comprises a plurality of fixed orifices (240) arranged in triads, i.e., sets of three, distributed along the length of nozzle (220). Each triad of orifices is arranged so that streams (at least one of which is the ozonated water) ejected from two or more of the triad orifices can be caused to impinge each other so as to atomize the ozonated water stream(s). That is, the orifices within each triad are preferably directed toward each other in such a manner that stream(s) of ozonated water ejected from one or more of the orifices will impinge, resulting in the stream(s) being broken up into large droplets. Alternatively, ozonated water may be ejected from one of the triad orifices and not be caused to impinge with a second fluid stream, thereby resulting in the delivery of a steady stream of the admixture. Nozzle (220) further includes a plurality of fans (224) distributed along the length of nozzle (220). Fans (224), in one embodiment of the system of the present invention, are used as an alternative to stream impingement in order to break a stream of ozonated water into sheets or large droplets.

Nozzle (220) further comprises a number of internal longitudinal passages fluidly coupling atomizing gas inlet (214) and admixture inlet (212) to the plurality of fixed orifices (240). Specifically, there is provided longitudinal passages (228, 232, and 234) that are fluidly coupled to fixed orifices (240) by corresponding outlet passages (242, 244, and 246) associated with each orifice triad. Similarly, longitudinal passage (230) is fluidly coupled to each fan (224) by virtue of corresponding outlet passages (238). Thus, for example, fluid transported through any of longitudinal passages (228, 232, and 234) is conveyed through outlet passages (242, 244 and 246), ejected from corresponding fixed orifices (240), and impinged in order to achieve controlled atomization of ozonated water. In a similar fashion, fluid transported through longitudinal passage (230) is conveyed through outlet passage (238) and dispensed through fans (224), thereby breaking the stream of ozonated water into sheets or large droplets.

Referring now to FIG. 4 there is illustrated a schematic diagram of a wet bench (400) suitable for attachment to outlet (40) as illustrated in FIG. 1 to effect an alternate mode of the controlled dispensing as described herein. As shown, pressurized liquid outlet conduit (6) is fluidly coupled to outlet (40) which is fluidly coupled to vessel (450). Vessel (450) is of a suitable size so as to be capable of enclosing one or more silicon wafers (460) for cleaning. Vessel (450) is preferably also of suitable size such that the desired small surface area/volume ratio will be achieved upon controllably dispensing admixture into vessel (450).

Wafer (460) is supported by carrier (462) in a manner such that at least one surface of the silicon wafer (460) may be contacted by ozonated water introduced to vessel (450) through outlet (40). Vessel (450) preferably also comprises outlet (470) to prevent overflow of ozonated water out of vessel (450). Flow of ozonated water through outlet (470) is controlled by valve (472). Ozonated water exiting vessel (450) through outlet (470) may simply be dispensed of, or alternatively may be recirculated back through the system through a recirculation loop (not shown).

In operation, ozonated water will be controllably dispensed into vessel (450) through outlet (40) under sufficiently gentle (i.e. non-turbulent) conditions such that a substantial amount of dissolved ozone remains in solution. Ozonated water will be allowed to flow into vessel (450) until a sufficient amount has entered to cover at least one surface of silicon wafer (460). At this time, valve (472) on outlet (470) may be activated and the flow of ozonated water through outlet (470) adjusted to be equivalent to the flow into vessel (450) through outlet (40). In this manner, a continuous method for cleaning the surface of silicon wafers is provided.

Without being bound by any theory. Applicants believe that the ability to retain such a high percentage of ozone in solution is dependent upon one or more of (a) the surface area/volume ratio of the delivered admixture generated by controlled dispensing, (b) the time that elapses from the time the admixture is dispensed from spray post (200) to the time the atomized admixture reaches the point of use, i.e., the surface being treated; and/or (c) the flow rate of the stream of admixture being dispensed.

With respect to the surface area/volume ratio, for example, the ability of the ozone to diffuse out of the dispensed volume of admixture depends in part upon the surface area of the admixture/atmosphere interface. For a larger surface area/volume ratios, i.e., smaller droplets or vessels with a large surface area relative to volume, the ozone has ample opportunity to diffuse from the surface area of the droplet or the vessel, and thereby be lost. On the other hand, for smaller surface area/volume ratios, i.e., larger droplets or vessels with a small surface area relative to volume, the ozone is less able to diffuse from the surface area of the droplet or the vessel. In practical effect, more ozone is trapped in the larger sized droplets (or vessel with a small surface area/volume ratio) and remains available for surface treatment.

Thus, in the practice of the present invention, it is preferred that the admixture is dispensed under sufficiently gentle conditions in a manner such that the resulting volume of dispensed admixture has a small surface area/volume ratio. That is, if the admixture is to be atomized or dispensed by a fan structure, it is preferred that the resulting droplets have an average diameter of at least 0.5 mm, preferably from about 0.5 mm to about 5 mm, more preferably 1 mm to 3 mm. Average droplet size may be determined by any suitable manner known by those of ordinary skill in the art. For example, droplet size may be determined by visual observation of the droplets as illuminated by a strobe light. Alternatively, if the admixture is to be dispensed into a treatment vessel, as for use in a wet bench method of processing wafers, or dispensed directly to a point of use as a steady stream, it is preferred that the admixture be dispensed under laminar flow conditions, preferably at a flow rate of from about 1 liter/minute to about 20 liters/minute. If the admixture is to be dispensed into a treatment vessel, it is further preferred that the vessel have a surface area/volume ratio of from about 0.01 to about 0.1.

With respect to the time that elapses from the time the admixture is dispensed from spray post (200) to the time that the admixture reaches the point of use, generally, more ozone can escape from the admixture as this period of time becomes longer. Accordingly, to further maximize the amount of ozone remaining in the admixture at the point of use, it is preferred that the distance between the spray post (200) and the surface be as close as is practically possible. It is further preferred, therefore, that the time that elapses between the moment the admixture is dispensed to the moment it reaches the point of use is from about 0.01 seconds to about 5 seconds. More preferably, the time that elapses will be less than 2 seconds.

With respect to the flow rate of the stream being dispensed, it is preferred that the stream of admixture to be dispensed is supplied to spray post (200) under laminar flow conditions. Generally, ozone can diffuse more easily from admixture delivered as a turbulent stream, so that transporting stream under laminar flow conditions further maximizes the amount of ozone that remains in the dispensed admixture.

The present invention will now be further described with reference to the following examples.

EXAMPLE 1

This experiment was conducted to show the effect of different dispense techniques on the amount of ozone that remains in an ozonated water solution at the point of use. The effects on the efficiency of the dispense methods were evaluated when the following parameters were varied: atomizing gas pressure, nozzle design, and the rate of flow of admixture through the nozzle.

The initial ozone concentration was measured by taking a side stream of ozonated water from the pressurized vessel and using a commercially available sensor to measure the dissolved ozone concentration. A second sensor was used to measure the dissolved ozone concentration after the liquid was dispensed through the spray post by collecting the liquid and funneling it to the sensor. The percentage ozone remaining in solution was calculated by the formula $[O3_{final}]/[O3_{inital}]*100$, where the symbol [O3] stands for the concentration of ozone dissolved in water.

Using the spray post described hereinabove, atomization was achieved by causing a stream of atomizing gas to impinge with a stream of ozonated water. Two sets of controls were employed, one representative of ozonated water delivered as a steady stream ("no atomization") and one representative of "conventional" atomization (i.e., atomization with atomizing gas supplied at high pressure, specifically, atomization at 20 and 40 psi). Experiments were then conducted on ozonated water subjected to controlled atomization with atomizing gas supplied at 4 psi and 6 psi.

Using conventional atomization, droplets of approximately 0.1 mm were created. Additionally, and as is illustrated in Table 1, hereinbelow, conventional atomization resulted in the loss of up to 92% of the ozone that had been in solution before dispensing. In contrast, using controlled atomization, droplets of about 1.0 mm in diameter were observed, and 50–61% of the ozone remained in solution. Additionally, the delivery of a steady stream of ozonated water (i.e., through one fixed orifice of the nozzle with no impingement with an atomizing gas) at a flow rate of 1000 cc/min at 22° C. resulted in 67% of the dissolved ozone remaining in solution.

Additional experiments were conducted to evaluate the efficiency of utilizing the fan mechanisms described hereinabove to controllably dispense the ozonated water. That is, using the spray post described above, a stream of ozonated water was caused to flow through the fan structure described, resulting in the stream of ozonated water being broken up into sheets and/or large droplets. As is also shown in Table 1, using fans to atomize the ozonated water produced droplets with a diameter of about 1.0 mm and a relatively high percentage of ozone remaining in solution.

Finally, experiments were conducted to evaluate the efficiency of using stream impingement of two streams of ozonated water to controllably dispense the ozonated water. That is, utilizing the spray post described above, two streams of ozonated water were made to impinge through 8 or 75 fixed orifices with diameters of from about 0.022 inches to about 0.028 inches. When both streams were at a flow rate of 2.0 liters/minute, it was found that up to 48% of the ozone remains in solution. When the two streams of ozonated water are at higher flow rates prior to impingement, an overall smaller droplet diameter was observed. As a consequence, a lesser amount of ozone remained in solution. The results of this experiment are also illustrated in Table 1, hereinbelow.

TABLE 1

| Conditions | Initial conc. | Concentration after dispensing | % remaining | $O_3$ water pressure |
|---|---|---|---|---|
| 1000 cc/min No atomization, 60 deg C. | 8.3 ppm | 2.1 ppm | 25% | 20 psi |
| 1000 cc/min, No atomization, 40 deg C. | 8.7 ppm | 5.3 ppm | 60% | 20 psi |
| 1000 cc/min, No atomization, 22 deg C. | 7.9 ppm | 5.3 ppm | 67% | 20 psi |
| 1600 cc/min, High atomization (40 psi), 22 deg C. | 7.8 ppm | 0.6 ppm | 8% | 20 psi |
| 1600 cc/min, Low atomization (20 psi), 22 deg C. | 7.5 ppm | 1.2 ppm | 16% | 20 psi |
| 1600 cc/min, 6 psi atomization, 22 deg C. | 7.6 ppm | 3.8 ppm | 50% | 20 psi |
| 1600 cc/min. 4 psi atomization, 22 deg C. | 7.8 ppm | 4.4 ppm | 57% | 20 psi |
| 1600 cc/min, 4 psi atomization, 22 deg C. | 8.0 ppm | 4.9 ppm | 61% | 20 psi |
| Fan spray 2.0 1/min, 22 deg C. | 8.2 ppm | 5.4 ppm | 75% | 20 psi |
| Fan spray 1.5 1/min. 22 deg C. | 8.5 ppm | 6.6 ppm | 76% | 20 psi |
| Fan spray, 1.0 1/min. 22 deg C. | 7.2 ppm | 7.0 ppm | 82% | 20 psi |
| Colliding streams, 75 holes, 2 L/min, 22 deg C. | 50.0 ppm | 24.0 ppm | 48% | 30 psi |
| Colliding streams, 8 holes, 2 L/min, 22 deg C. | 50.0 ppm | 17.3 ppm | 35% | 30 psi |
| Colliding streams. 75 holes, 10 L/min, 22 deg C. | 50.0 ppm | 7.6 ppm | 15% | 30 psi |

In summary, dispensing the admixture at a high rate of flow (e.g. 1600 cc/min) at atomization pressures of 20 psi or greater results in a dramatic decrease of ozone that remains in solution. In contrast, by utilizing a low rate of flow (e.g., 1000 cc/min) and/or a low pressure means of atomization, an increased amount of ozone remains dissolved in the admixture. Additionally, when a fan spray method is used to dispense the admixture, up to 82% of the dissolved ozone remains in solution.

EXAMPLE 2

This experiment was conducted to show the effect of increased ozone concentration on the oxidation of a silicon surface. In this experiment, the dispense technique and all other parameters were held constant, while the pressure of the pressurized vessel was varied. As a result of the varied pressure, the concentration of dissolved ozone in water varied, and thus the time required for complete oxidation of a silicon surface.

Specifically, 1.0 ppm ozonated water was generated at a low power setting on the ozone gas generator and by maintaining the pressurized vessel at 0 psi, 10.0 ppm ozonated water was generated at a high power setting on the ozone gas generator and by maintaining the pressurized vessel at 0 psi; and 50.0 ppm ozonated water was generated using a high power setting on the ozone gas generator and maintaining the pressurized vessel at a pressure of 25 psi. The ozonated water was then dispensed onto silicon wafer surface.

Figure 5:
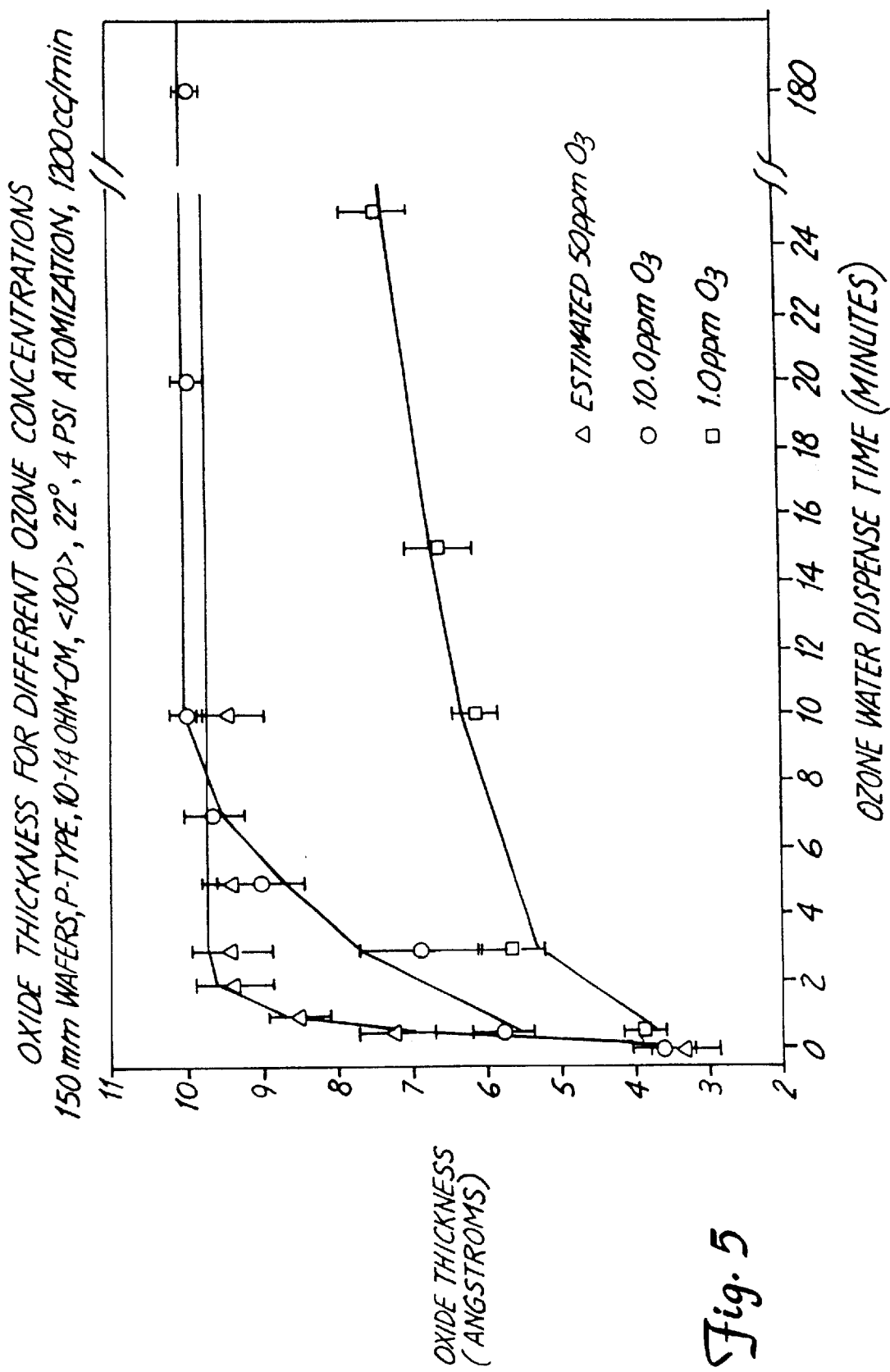
FIG. 5 is a graphical depiction of the effect of ozone concentration on the oxide thickness generated on the surface of a silicon wafer at different time intervals.

As is illustrated in FIG. 5, 10 minutes was required to completely oxidize the surface of a wafer using 10.0 ppm ozonated water. In contrast, the 50.0 ppm ozonated water completely oxidized the surface of the silicon wafer is 2 minutes. It was thus concluded that a five-fold increase in ozone concentration results in a five-fold decrease in the time necessary to completely oxidize a silicon wafer surface.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A treatment method comprising the steps of:
positioning at least one in-process silicon wafer in a chamber;
providing an aqueous composition, said composition being made by a method comprising the step dissolving an amount of ozone into a pressurized aqueous liquid in an amount to form an aqueous ozone composition; and
dispensing the pressurized aqueous ozone composition into the chamber under supersaturated conditions effective to treat the in-process silicon wafer.

2. The method of claim 1, wherein said aqueous liquid additionally comprises a member selected from sulfuric acid, hydrochloric acid, hydrofluoric acid, a fluorinated liquid or combinations thereof.

3. The method of claim 1, wherein the wafer comprises a photoresist material.

4. The method of claim 1, wherein the wafer comprises an organic contaminant.

5. The method of claim 1, wherein said pressurized aqueous liquid is at a pressure of from about 1.1 atmosphere to about 10 atmospheres.

6. The method of claim 1, wherein the liquid additionally comprises a member selected from sulfuric acid, hydrochloric acid, hydrofluoric acid, a fluorinated liquid or a combination thereof, and wherein the wafer comprises a material selected from a photoresist material, an organic contaminant, or a combination thereof.

7. The method of claim 1, wherein the wafer comprises a material on a surface of the wafer, and the treatment step comprises removing at least a portion of the material.

8. The method of claim 1, wherein the wafer comprises an oxidizable material on a surface of the wafer, and wherein the treatment step comprises oxidizing the material.

9. The method of claim 1, wherein the liquid comprises ultrapure deionized water.

10. The method of claim 1, wherein the supersaturated ozone composition comprises at least about 50 ppm of ozone.

* * * * *

UNITED STATES PATENT AND TRADEMARK OFFICE
CERTIFICATE OF CORRECTION

PATENT NO.    : 6,648,307 B2                                        Page 1 of 1
DATED         : November 18, 2003
INVENTOR(S)   : Nelson et al.

It is certified that error appears in the above-identified patent and that said Letters Patent is hereby corrected as shown below:

<u>Column 2,</u>
Line 1, "that-are" should be -- that are --.

<u>Column 6,</u>
Line 41, "conduit, and" should be -- conduit; and --.

<u>Column 7,</u>
Line 59, "sensing device (3)" should be -- sensing device (3). --.

<u>Column 10,</u>
Line 65, "droplets are formed" should be -- droplets are formed. --.

<u>Column 15,</u>
Line 18, "vessel at 0 psi, 10.0" should be -- vessel at 0 psi; 10.0 --.

Signed and Sealed this

Fifteenth Day of June, 2004

JON W. DUDAS
*Acting Director of the United States Patent and Trademark Office*